(Model.)

A. C. MILLER.
GRAIN BINDER.

No. 263,715. Patented Sept. 5, 1882.

Witnesses:
Alex Mahon
Geo. M. Finckel

Inventor:
Andrew C. Miller
by A. M. Smith
atty.

(Model.)

A. C. MILLER.
GRAIN BINDER.

No. 263,715. Patented Sept. 5, 1882.

Witnesses:
Alex Mahon
Geo. M. Finckel

Inventor:
Andrew C. Miller
by A. M. Smith
Atty.

(Model.)

A. C. MILLER.
GRAIN BINDER.

No. 263,715.     Patented Sept. 5, 1882.

Witnesses:
Alex Mahon
Geo. M. Finckel

Inventor:
Andrew C. Miller
by A. M. Smith
atty.

(Model.)

A. C. MILLER.
GRAIN BINDER.

No. 263,715.

Patented Sept. 5, 1882.

Witnesses:
Alex Mahon
Geo. M. Ginckel

Inventor:
Andrew C. Miller
by A. M. Smith
Atty

(Model.)

A. C. MILLER.
GRAIN BINDER.

Patented Sept. 5, 1882.

Witnesses:
Alex Mahon
Geo. M. Finckel

Inventor:
Andrew C. Miller
by A. M. Smith
Atty.

(Model.)

A. C. MILLER.
GRAIN BINDER.

No. 263,715.  Patented Sept. 5, 1882.

Witnesses:
Alex Mahon
Geo. Finckel

Inventor:
Andrew C. Miller
by A. M. Smith
atty

UNITED STATES PATENT OFFICE.

ANDREW C. MILLER, OF SPARTA, ILLINOIS, ASSIGNOR TO D. M. OSBORNE & CO., OF AUBURN, NEW YORK.

GRAIN-BINDER.

SPECIFICATION forming part of Letters Patent No. 263,715, dated September 5, 1882.

Application filed November 3, 1880. (Model.)

*To all whom it may concern:*

Be it known that I, ANDREW C. MILLER, of the town of Sparta, in the county of Randolph and State of Illinois, have invented certain new and useful Improvements in Grain-Binders; and I do hereby declare that the following is a full, clear, and exact description of the construction, application, and operation of the same, reference being had to the drawings accompanying the same, in which—

Fig. 3 is a plan view of the switch-frame, and Fig. 4 is an edge view of the same. Fig. 5 is a top view of the knotter shield-plate, and Fig. 6 an edge view of the same. Fig. 7 is a plan view of the knife or cutter and its spring, and Fig. 8 an edge view of the same. Fig. 9 is a perspective view of the horizontally-oscillating knotter-carrying arm, showing the cord-holding devices and their operating mechanism, with the switch-frame, knotter-spindle, &c., taken from the opposite side from Fig. 2; and Fig. 10 is a similar view of the oscillating arm, &c., taken from the front. Fig. 11 is a side view of the cord-holder on an enlarged scale, seen from the inner side, as in Fig. 9, showing the cord in position in the jaws; and Fig. 12 is a perspective view of the cord-holder with its jaws open and the band-cutter drawn back. Fig. 13 is a perspective view of the knotter-spindle with its pivoted hook and the devices for operating said hook. Fig. 14 is a view of the cord band, with the knob as formed by the knotting devices. Fig. 15 is a vertical sectional view of the knotter-spindle and its pinion, the connecting-rod and trunnion, and pivoted hook, the same being taken through the center of the hook. Fig. 15ª is a view of the hook detached.

The invention relates to a novel construction of the cord holding and knotting devices, and a novel arrangement of the same in connection with a horizontally-oscillating carrying-arm, a fixed switch-frame, and a vertically-oscillating and horizontally-swinging cord-carrying arm, and will be best understood from the following description, with reference to the drawings.

The binding mechanism is shown applied to a machine of the class known as "harvesters" by the trade—that is, a machine constructed to receive the cut grain as it falls, carry it to the stubble side of the machine, elevate it over the driving-wheel, and discharge it on the stubble side of said driving-wheel upon a receiving-platform or on the ground. As this class of machines is well known, only so much of the harvester will be described as becomes necessary to an understanding of my improved binding mechanism and the mode of application of the same to the harvester.

In the drawings, A A represent transverse bed-pieces of the harvester-frame in front and rear of the main supporting and driving wheel; C and B the outer and B' the inner longitudinal bar, the driving-wheel C being located between these bars. By means of brackets connected with the beams B and B' said wheel supports these beams and the frame-work and operating machinery connected therewith and the grain elevating-aprons D' and E. The outer or divider end of the machine is supported by a smaller wheel located nearly opposite the main wheel C, the frame-work and machinery mounted thereon being very nearly balanced on the two wheels.

A binder-frame, D, of metal, is supported by guide-pieces n n, bolted to the beam B, and is held by a short guide-piece or hook fastened to a beam under the binder-table. In these guide-pieces the binder-frame, with the devices connected therewith, and the table E can be moved forward or back for the purpose of placing the band in proper position around the bundle, the movement being effected by the driver on his seat by means of the hand-wheel o o and its shaft and pinion connected with a rack on the binder-frame.

A vertical rock-shaft, T', is supported in bearings p p q q on the frame D. On the upper end of this shaft is formed a fork or jaw, F', to which is pivoted the cord-carrying arm G by means of the pivot-pin H. The forward end of the arm is bent downward at nearly right angles to its body, and has a needle-point, G', which, near its point, has a mortise through it, in which are journaled two sheaves, M', between which the cord N passes. A sheave, M, is located on the arm G at its bend, and a tension-sheave, L', is placed on the arm a few inches farther back. The lower end of the rock-shaft T' has jaws J, to which is pivoted one end of an arm, I', by a pivot-pin, $m$ $m$, the other end of the arm being fitted as a pivot in a bearing, $a^2$, on the gear-wheel R, near its circumference. The gear-wheel R is supported in the bearing R', so as to bring its axis to coincide with a line intersecting the axis of the pivot-pin $m$ $m$ of the jaw J, and also the axis of the rock-shaft T'.

To the lever I', near its intersection with the wheel R, the lower end of the pitman H' is pivoted by a stud, $b^2$. Said pitman is curved backward to give room for the table E', and is united by a pivot, I, to the binder-arm G in front of the pivot H, connecting it with the vertical rock-shaft T'. This pitman H' has an extension, J, carried above its pivot I, and on the top of it is pivoted a bell-crank lever, K, having on its upper end a sheave, K', the other arm of the lever being connected by a spring, L, to the link $r$ $r$, having holes for the adjustment of the spring L to greater or less tension. This lever K and its connecting parts form a take-up for the slack of the cord when the machine is in operation.

Figure 1:
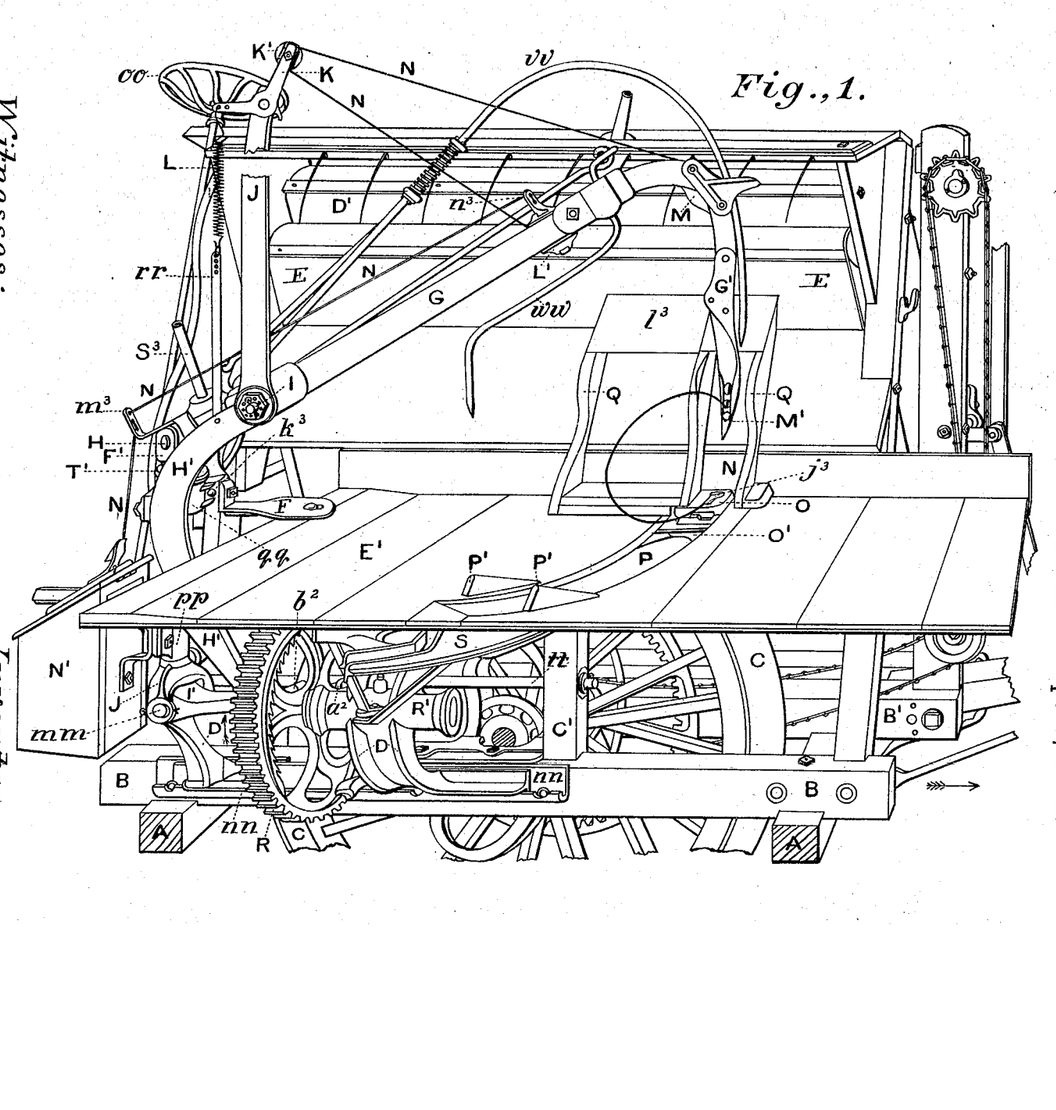
Figure 1 is a perspective view of the binding mechanism as applied to a harvester, looking toward the grain-delivery or driving-wheel end of the machine.

The gear-wheel R has a rotary motion imparted to it in a direction from its top inward by a pinion on the shaft $t\,t$, Fig. 1, supported at its forward end in the post C' and at its rear end by a similar post. This shaft has on its rear end a sprocket-wheel, which is connected by a square-linked chain to a sprocket-wheel of less size on the crank-shaft which drives the cutter-bar. These several parts, with the exception of shaft $t\,t$, are not shown in the drawings, as any known and convenient way of imparting motion to the gear-wheel R from the driving and supporting wheel C of the harvester will answer the purpose.

Figure 2:
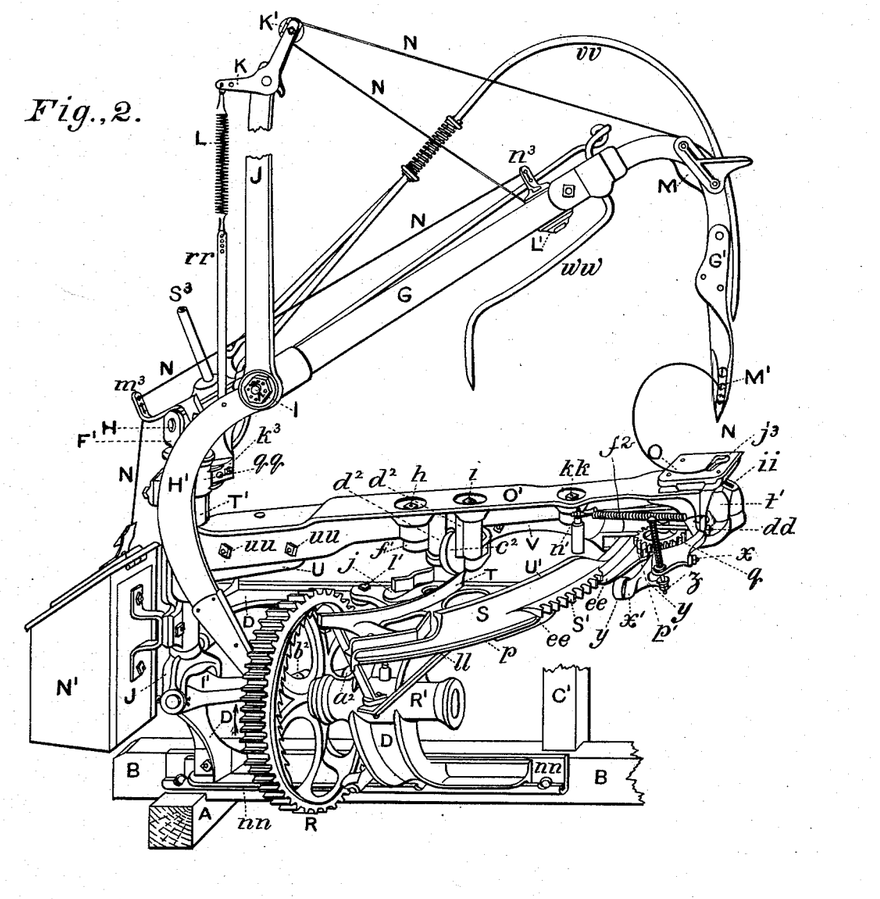
Fig. 2 is a similar view, the grain-receiving table being removed and all of the harvester parts omitted, except so much of the harvester-frame as supports the binder.

An arm, O', is provided, one end of which is bolted to the projecting flange U of the vertical rock-shaft T' by bolts $u\,u$, as shown in Fig. 2, so as to project at right angles to the axis of the pivot H of the cord-carrying arm G, the arm O', lever I', and arm G being arranged substantially in the same vertical plane. This arm O' has, in addition to the support derived from the rock-shaft T' to which it is attached, a roller, $c^2$, arranged in bearings $d^2$ about midway of its length, which roller rests and rolls upon the curved rail or track T on the switch-frame S. The arm O', cord-carrying arm G, pitman H', lever I', and the devices connected therewith being thus united and supported by the rock-shaft T' and the wheel R, they receive a compound motion from the rotation of the wheel R on its axis. In Figs. 1 and 2 these parts are represented with the projecting end of the arm O' thrown inward toward the harvester to nearly its extreme limit, in which position the cord-carrying arm G is descending, the point of the needle G' having nearly reached the knotter shield-plate O, and the arm I' approaching a horizontal position. The continued revolution of the wheel R carries the arm G, through its connection by pitman H' with the lever I', farther down, the needle end entering the opening $j^3$ in the plate O. The continued revolution of the wheel R, carrying with it the end of the lever I' pivoted to it, imparts to the rock-shaft T', to which the lever I' is pivoted, a rocking movement corresponding to the two extreme horizontal positions of the lever I' produced by the rotation of the wheel R. A corresponding oscillating movement on the rock-shaft T' as a pivot is imparted to the arm O', and the same horizontal, combined with a vertical, movement is imparted to the cord-carrying arm G, the vertical motion being imparted to it by its connection through the pitman H' with the lever I'. The cord-carrying arm G thus has a vertically-oscillating and laterally-swinging motion.

On the arm G, and supported by it, are separating-rods $v$ $v$ and $w$ $w$, which aid in separating the grain forming the bundle from the sheet of grain flowing from the mouth of the elevating-aprons D' and E; but as no claim is made to these separating devices, further description of them is unnecessary.

The knotting device consists of a hollow shaft or spindle, $r$, (see Figs. 13, 15, 17, and 18,) to which, near its circumference, a hook, $r'$, is pivoted, the hollow spindle at that side being cut away for a little more than half its diameter, leaving the opposite side, which is in the form of a vertical section of a cone, projecting beyond the body of the spindle far enough to form a lip or finger for the point of the hook $r'$ to close against, (see Fig. 15,) and in its closed position to form, with the lip, substantially a conical-shaped point for the cord to slip over in completing the knot.

Figure 19:
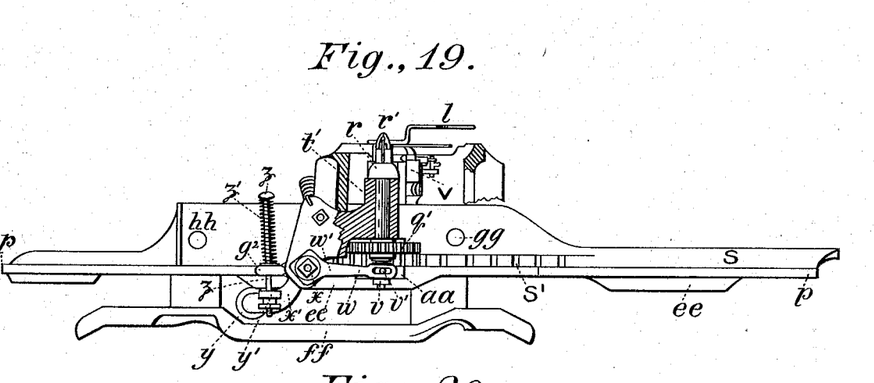
Fig. 19 is a vertical cross-section of the knotter-carrying arm through the knotter-stand.

Fig. 15ª shows the form of the radially-swinging hook, which has, in addition to the hole for pivoting it to the spindle $r$, a slot, $f^2$, through which it is connected with the sliding rod $s$ by the pin $t$. (See Figs. 14, 15, and 17.) This rod $s$ nearly fills the bore of the hollow spindle $r$, and is slotted at its upper end sufficiently to receive the hook, and the pin $t$ passes through the long opening $f^2$ of the hook $r'$. The hook being pivoted to the shaft $r$ and the rod $s$ being fitted to slide in the shaft $r$, this long opening $f^2$ is necessary to the free working of the hook by the rod without binding. This rod s extends below the spindle in which it works, and is connected at its lower end to the jaws w of the lever w' by a washer or thimble, u, having trunnions v', (see Figs. 13 and 15,) and held in position by the nuts w' above and v below the thimble u, by which means the rod s can be adjusted up or down to adapt it to properly close and open the hook r'. In order to give the rod s the necessary vertical movements for opening and closing the hook, the lever w' is connected to one end of a journal-piece, x. (See Fig. 13.) To the other end of the journal-piece is connected a lever, x', the two levers x' and w' projecting at right angles nearly from the opposite ends of their journal-piece and standing nearly in the same horizontal plane. To the outer end of the lever x' is pivoted a roller, y, its axis being at right angles to the lever and parallel to the journal-piece x. An ear, y', projects from the arm x' at a point opposite the roller, and in it is inserted a rod, z, surrounded by a coiled spring, z'. A gear-pinion, q', (see Figs. 13 and 15,) is keyed to the lower end of the knotter-spindle r. The several parts, shown in Fig. 13, are supported by suitable bearings formed in a stand or frame, t'. (See Figs. 2, 9, 10, 16, 19, and 20.) Fig. 19 shows a vertical section through the stand t' with the knotter-spindle r and its connecting pieces in position, and Fig. 20 a view of the under side of the same, showing the stand t' as connected to the end of the arm O' by bolts c c and d d. The stand t' has a projecting ear, $g^2$, on the side of the bearing for the journal x. In this ear is a hole, through which the rod z is free to slide. The spring z' is placed upon said rod above the ear and below its head, said spring serving to keep the roller y up against the track or camway e e on the under side of the switch-frame S.

In order to more fully guide the roller y, a track or rail, f f, (see Figs. 4 and 19,) is arranged below the track or camway e e and bolted to the switch-frame S by bolts g g and h h, leaving a space between the two tracks e e and f f a little greater than the diameter of the roller. The switch-frame S (see Figs. 3, 9, 10, and 16) has slots j j in it, through which it is secured by bolts l' to the binder-frame D, the switch-frame being shown in position on the binder-frame in Fig. 2.

For holding the end of the cord, a holder, V, is provided. (See Figs. 11 and 12 for enlarged detached views of the same, both being views from the inner side of said holder as located in working position on the machine.) This cord-holder has a fixed jaw, W, and a movable jaw, $i^2$, the latter being seen in Fig. 11 as closed on the fixed jaw with the cord N in position, and in Fig. 12 drawn back, with the end of the cord released and the needle part of the cord in position for the jaws to close upon it when not held back against the pressure of the spring a'. The movable jaw has a shank-piece, V', curved outward from its body or toothed end, and is made wide enough to admit of a slot, g', through it. Its continuation beyond the slot is rounded, as at Z, for receiving a spring, a'. This rounded part is supported by a guide-piece, Y', attached to the body of the holder. The outer end of the movable jaw is held in place by a cap-piece, X, fastened to the holder V, this cap-piece having a horizontal slot for the curved shank to work in.

A cutter, W', has a rounded shank, Y, to receive a spring, a, said shank being fastened to the wide end of the cutter at one end, the other end passing through a guide piece or ear, X', on the holder V. The cutter W is supported by a mortise in the cap X, and is arranged to slide just above the movable jaw $i^2$, and parallel to it, the cutting end or knife, in its forward movements, passing the point where the jaws W and $i^2$ meet, so that the cutting of the cord may be certain. The forward movement of the cutter and movable jaw is due to the action of their respective springs a and a'. To open or draw back the cutter and jaw against their springs, a rod, b, is provided, having a cross-head, b', at one end and an enlarged perforated head at the other end, provided with a thread cut therein for receiving the screw end of the rod e. A nut, e', on the rod serves to hold the rods e and b in their adjusted position, their combined length being increased or diminished at pleasure for giving the desired throw to the cutter W' and opening between the jaws. The rod e has formed on its inner or rear end a link-shaped loop, $j^2$. (See Figs. 9, 11, and 16.) The upper end of the cross-head b is inserted in a hole formed in the end of the cutter W', while the lower end is inserted in the opening g' in the shank V' of the movable jaw. The loop end $j^2$ of the rod e is placed on the pin f', carried by the lever f. A roller, g, is journaled on the lower end of the pin f', which passes vertically through the outer or vibrating end of the lever f for that purpose. The lever f is pivoted in the arm O' at h'.

The cord-holder V, heretofore described, is pivoted at d to a bracket, d', which is bolted through a hub, $k^2$, to the arm O' by the bolt i. The outer or forward end, V, of the cord-holder is inserted in a vertical groove, i i, formed in the knotter-stand t', and which serves to guide it in its vertical movements. A bail, e', fastened to the top of the cord-holder V, in connection with a lip or pressure-piece, m, connected with the cord-finger l, as will be hereinafter described, serves to hold the cord after it is released by the jaws in finishing the tying of the knot. A hook or lip, c, is formed on the under side of the cord-holder V. (See Figs. 9, 11, and 12, Fig. 9 showing it in position in the machine under the cam-rib U' on the switch-frame, and the body of the holder V resting on top of said rib.) The upper surface of this cam-rib U' is shown in Fig. 4, and the lower surface corresponds with it in shape, the ribs being of uniform thickness, so that the hook or lip c and the body of the cord-holder V, when it rests on the rib U', will slide freely over it.

A switch, i', is pivoted in the switch-frame S by the vertical pivot j. This pivot j, which projects below the frame, has a short lever, j', connected by a spring, k, to a similar lever, k', on the pivot $l^2$ of the switch o, the spring k serving to keep both switches in working position. The switch o is pivoted to the switch-frame S by its vertical pivot $l^2$, as shown, and serves to close the cord-finger l, as will now be described.

The cord-finger l (see Figs. 9, 10, 16, and 19) is pivoted in the knotter-stand t' at $c^2$. (See Fig. 9, where the arm O' is broken away to show it more clearly.) To the lower end of this pivot is secured a short arm, m', to the projecting end of which a link-rod, n, is connected. (See Fig. 10.) The other end of the rod is connected by an eye-piece, $d^2$, to the vertical stud $e^2$, passing through a sleeve on the vibrating lever n'. The eye-piece $d^2$ has a hole with a screw-thread cut in it, and the end of the rod n has a thread cut on it for uniting the two and adjusting their length. A spring, $f^2$, has one of its ends connected with the eye-piece $d^2$, its other end being connected to a downward-projecting lug on the arm O'. On the lower end of the stud $e^2$, which projects for the purpose, a roller, o', is pivoted. The lever n' is pivoted to the arm O' at k k. For operating this lever, and through it the cord-finger l, a track or rail, $g^2$ $g^3$, is raised on the switch-frame S, equal in height to the depth of the roller o', an opening, $h^2$, being left between $g^2$ and $g^3$ for the passage of the roller o' on its outward movement, a deflecting track-piece, $h^3$, being connected with $g^2$ near the opening $h^2$, so as to insure the passage of the roller o' through the opening $h^2$. The switch o, heretofore described, being pivoted to the switch-frame S at a point near the inner end of the track $g^3$, the roller o' on the arm n', in its inward and outward movements, is made to travel on opposite sides of the track $g^3$ and switch o, as will hereinafter be described in detailing the operation of the machine.

With the cord-finger l is connected a pressure-plate, m, which moves with it, and, in connection with the bail c' on the cord-holder V, serves to grip the cord and hold it after its release from the jaws of the cord-holder. These several parts are shown in working position in Fig. 16.

Figures 16, 17, 18:
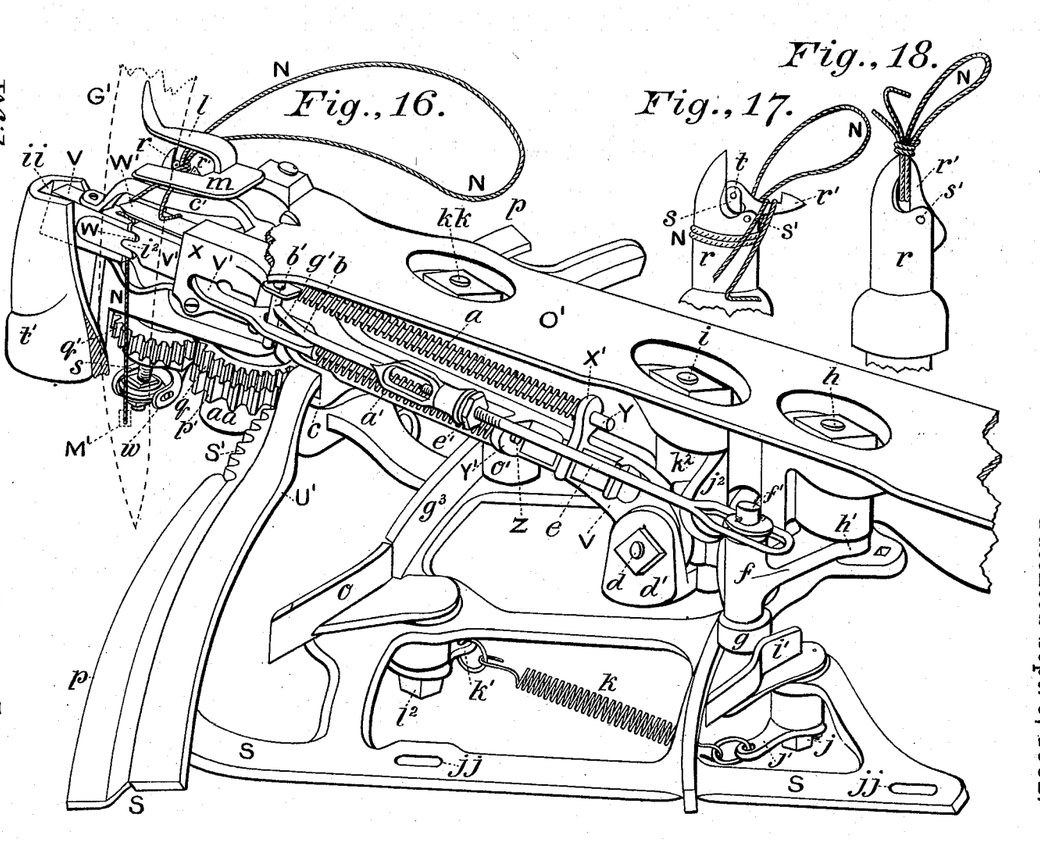
Fig. 16 is a perspective view of the knotter-carrying arm and its attachments as seen from the inner side, partly broken away to show the position of some of the parts.
Fig. 17 is a view of the upper end of the knotter-spindle, (full size.)
Fig. 18 is a view of the same with hook closed and knot completed, ready to be discharged.
Figure 20:
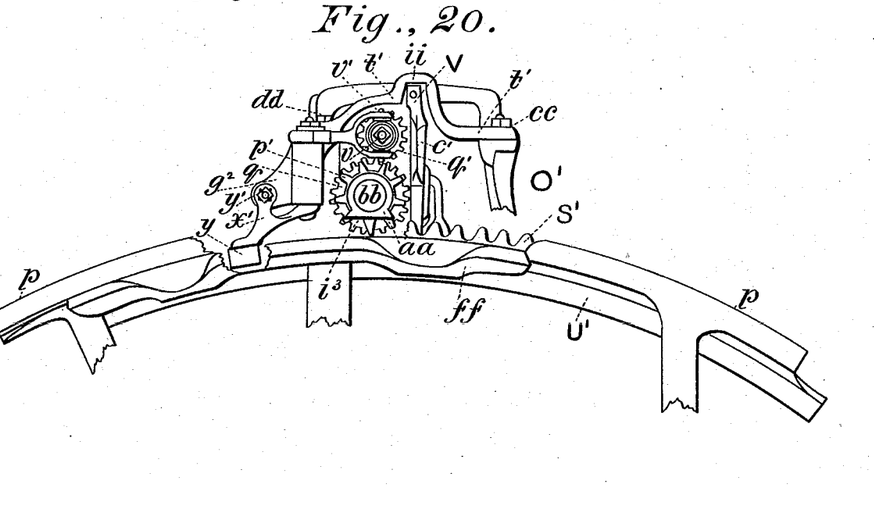
Fig. 20 is a bottom plan view of the knotter-stand, showing the knotter-pinion, intermediate gears, &c., also the cam-track and segment-rack for operating the knotter-spindle.

For communicating a rotary motion to the pinion q' on the lower end of the knotter-shaft r, two gear-wheels, p' and q, are united and supported on a fixed stud, b b, projecting downward from the under side of the knotter-stand t', Figs. 16 and 20. The wheel p' has a hub, a a, projecting below it, the two wheels and said hub being connected so as to revolve freely together on their supporting-stud b b, which has an enlarged head that is recessed into the hub a a, and serves to hold it on the stud. This hub has a flattened side or delay-surface, $i^3$, which serves, in connection with the projecting ribs p at either end of the sector-gear S' on the switch-frame S, to lock and hold the gear-wheels from displacement after they have passed beyond the influence of the sector-gear S'. These gear-wheels are so arranged that while the gear-wheel q meshes with the pinion q' on the knotter-shaft r the wheel p' meshes with the sector-gear S', and the hub a a is in position to bring the delay-surface $i^3$ in contact with the ribs p when the gear p' is out of mesh with the gear S'.

A plate, O, is provided, (see Figs. 5 and 6 for form, and for location see Figs. 1 and 2,) having an opening, $j^3$, for the passage of the needle and for guiding the cord properly to the knotter under the action of the cord-finger l, said plate also serving to shield the knotter parts from straws. It is fastened to the outer end of the arm O' over the knotter by bolts or screws.

To receive and hold the grain until sufficient has accumulated for a bundle, and while the bundle is being bound, a table or platform, E', is provided, which is supported at the knotter end by a horizontal arm projecting under it from the harvester-frame, its other end being supported by a knee-piece, F, bolted to it, and a flange-piece, $k^3$, on the upper bearing of the vertical rock-shaft T'. The binding-platform has an opening, P, through it, made wide enough for the knotter-shield plate O, which projects through it, to travel in freely. This slot is curved in shape to suit the path in which the shield-plate travels, carried by the arm O'.

Brackets Q Q are fastened to the binding-platform at their lower ends, so as to move with it, and are hollowed out on their outer edges. They serve as a ledge against which the grain is pressed by the cord in encircling the bundle. They also serve to prevent the straw from being carried down into the tying mechanism by the binder-needle, which passes down between two of said brackets and behind the bundle. The binding-table being located below and in front of the discharging ends of the aprons D' and E, the grain falls upon the upper part of the brackets, which are inclined toward the aprons, and are united by an inclined shelf, $l^3$, so that the grain slides freely down in front of the brackets.

On the platform, at each side of the slot P, are fixed inclines or ways P' P', which serve in the completion of the knotting of the band (by raising the bundle as it is carried outward by the arm G) to draw the knot snug.

To hold the cord for binding, a box, N', is fastened by a bracket to the lower bearing-support of the vertical rock-shaft. It has a hinged cover, with a hole through it for the passage of the cord N, and a guide, $m^3$, is supported on the hinge end of the arm G, through which the cord N passes from the box to the tension-sheave L', passing first through an eye-piece, $n^3$, connected with the sheave, and thence once or twice around the sheave and up on the take-up sheave K', thence forward over the sheave M and through the needle-eye over the sheave M' to the jaws of the cord-holder V, as seen in Fig. 9. The tension-sheave L' has a spring and thumb-nut (not shown) for regulating the tension.

Having thus described the construction of the different parts and their relation to each other, I will now describe their operation.

As stated, the gear-wheel R has a rotation in the direction from the top inward imparted to it through its connection with the main supporting-wheel C and in its rotation through the lever I', which connects it with the rock-shaft T', and by the pitman H', which connects said lever I' to the binder-arm G, an oscillating motion vertically and a swinging motion laterally back and forth are given to said binder-arm. In these movements the needle begins to descend as the arm O' approaches the limit of its inward movement, and as it reaches that limit the needle-point G' passes down through the opening in the shield-plate. On its outward movement it remains below the plate. It begins to rise as it approaches the outward limit of the throw of the arm O', and reaches its extreme elevation when the arm O' commences its inward movement. The needle-point of the arm G in Fig. 1 is shown descending in the process of passing the cord around the bundle, the same position of the needle being also shown in Fig. 2. Fig. 9 shows the needle-point in the same position, looking at it from the inner side, with portions of the arm O' and knotter-stand broken away to show the cord-holder and the position of the end of the cord in its jaws, the cord extending to the needle, and being curved in the position it assumes as it is passed over and around the bundle. When the needle has reached its lowest point (see dotted lines in Figs. 12 and 16) and the arm O' has commenced its outward throw the roller $o'$ strikes the switch $o$ and is thrown toward the rear as it moves outward, and through its connection with the cord-finger $l$ brings the latter into the position shown in Fig. 10, the finger $l$ bringing with it both strands of the cord and holding them in position for the hook $r'$, which is open and stands in a position projecting at right angles from its spindle $r$ to catch the cords as it revolves. At this point the flattened side of the hub $a$ $a$ of the pinion $q$ leaves the rib $p$, and the teeth of the pinion-wheel $q$ are brought into mesh with the teeth S' of the sector-gear on the switch-frame S, causing the knotter-spindle $r$ to revolve and wind both parts of the band around the knotter-spindle $r$, below the hook, as shown. As the winding proceeds the cord-holder V rises on the cam U', (see Fig. 16,) yielding up slack cord to the knotter as it is taken up by the rotation of the spindle. The cord, as it is fed to the knotter, lies across the bail $c'$, and as the cord-holder rises the top of the bail is carried high enough to carry the cords over and across the hook $r'$ at the completion of one revolution of the shaft, as seen in Figs. 16 and 17. The cord-holder, being at its greatest elevation, brings the bail $c'$ up against the under side of the pressure-plate $m$ and clamps the cords hard enough to hold them during the completion of the knot. At this point the jaws W and $i^2$ are opened, as seen in Fig. 12, by the roller $g$ of the lever $f$ striking the switch $i'$, and being forced rearward, holding the movable jaw $i^2$ and knife W' open until the roller $g$ passes off of the switch $i'$, when the recoil of their springs closes them, the knife severing the cord above the jaws, and the jaws closing upon that part of the cord presented to them by the binder-needle and holding it, as seen in Fig. 16. The shape of the switch $i'$ is such that in connection with the slot $g'$ in the shank V' of the holder the cutter is opened in advance of the jaw $i^2$. The switch $i'$ is of sufficient length to hold the jaws and the cutter open long enough to permit the rotation of the knotter to draw out the end of the cord from the jaws of the cord-holder V, so that it will be above the cutter, and the jaws will then close only on the needle end of the cord. This position of the cord is shown in Figs. 12 and 16. At this point the knotter-hook $r'$ closes on the cord by the action of the spring $z'$ through the levers $x'$ $w'$ upon the rod S, the roller $y$ passing up the outer incline of the cam-rib $e$ $e$ on the under side of the switch-frame S. The outward movement of the arms O' and G brings the bundle over the inclined ways P' P', raising it and drawing the loop off of the knotter-spindle and over the ends of the cord held by the hook, and completing the knot, as seen in Fig. 18. The roller $y$ at this point strikes the outer downwardly-projecting rib, $e$ $e$, and opens the hook $r'$, releasing the bundle.

Having now described my invention, what I claim as new is—

1. In a grain-binder, the knotting devices carried by a horizontally-oscillating arm, in combination with a cord-holder connected by a horizontal pivot to said arm, and means whereby a vertical movement is imparted to said holder, substantially as described.

2. The combination, with the horizontally-vibrating carrying-arm, of the vertical knotter-spindle and the cord-holder connected to said arm by a horizontal pivot, permitting its vertical vibration, substantially as described.

3. The knotting devices and cord-holder applied to and moving with the horizontally-oscillating arm, in combination with the fixed switch-frame having a camway for imparting a vertical movement to the cord-holder, substantially as described.

4. The combination of the knotting devices carried on the horizontally-oscillating arm, the cord-holder pivoted to and receiving its horizontal movements from said arm and its vertical movements from the switch-frame, a pivoted switch on said frame for opening the jaws of the cord-holder, and a spring for closing the same, substantially as described.

5. The cord-holder connected by a horizontal pivot to the horizontally-oscillating arm at one end to admit of a vertical movement of its other end, in combination with a fixed vertically-grooved guide-piece for its moving end.

6. The rotating hollow vertical knotter-shaft provided with a fixed longitudinal finger, in combination with the radially-swinging hook or finger pivoted to said shaft, a horizontally-vibrating arm carrying said shaft, and means for operating said hook during the vibratory movement of the carrying-arm.

7. The combination of the hollow vertical knotter-spindle provided with the pivoted radially-swinging finger, the horizontally-vibrating arm carrying said spindle, the vertically-vibrating cord-holder pivoted in said arm, and the vertically-oscillating and horizontally-swinging cord-carrying arm, arranged and operating substantially as described.

8. In a cord-tying device, a revolving spindle provided with a longitudinal lip at one end and a radially-swinging finger pivoted to the spindle and co-operating with the lip, said finger being constructed and arranged to stand outward in a position substantially at right angles to the axis of the spindle during the formation of the loop, whereby the device is adapted to operate upon a cord lying in line with the axis of the tyer.

9. The hollow vertical knotter-shaft having a rotary and a horizontally-oscillating movement, as described, provided with the fixed longitudinal lip or finger and with a pivoted radially-swinging hook operating in connection with said finger, in combination with a rod sliding in and rotating with said shaft for operating said hook, said rod being pivoted at one end to the hook, and provided at its opposite end with an adjustable loose thimble or collar having trunnions, through which connection is made with the mechanism for actuating said hook.

10. The combination of the hollow knotter-spindle and its hook, the sliding rod and its trunnion-connections, with the double-armed pivoted lever $x'$ $w'$ and roller $y$, supported on the horizontally-oscillating arm, a camway or track on the switch-frame, and a spring for operating the hook $r'$, substantially as described.

11. The combination, with the horizontally-vibrating arm carrying the knotting devices, of the hollow vertical knotter-shaft having the longitudinal lip, the pivoted radially-swinging hook operating in connection with said lip, and the horizontally-vibrating cord-finger $l$ and means for operating it, substantially as described.

12. The cord-holder, its movable jaw, the knife, the rod $b$, having a cross-head, $b'$, the rod $e$, pivoted lever $f$, and pivoted switch $i'$, arranged and combined substantially as and for the purpose described.

13. The horizontally-vibrating pressure-plate $m$, in combination with the vertically-vibrating cord-holder provided with the bail $c'$ for holding the ends of the band after they are released by the cord-holder, substantially as described.

14. The combination, with the horizontally-oscillating arm carrying the knotter-spindle, of the pivoted cord-finger, the pressure-plate connected therewith, and the bail on the vertically-vibrating cord-holder, arranged and operating substantially as described.

15. The combination, with the grain elevating and discharging aprons, of a slotted grain-receiving table located outside of and below the discharging ends of said aprons, a horizontally-oscillating arm arranged below said table, a rotating hollow vertical knotter-spindle and hook carried by said arm, a vertically-oscillating cord-holder controlled in its vertical movements by a fixed camway, and a vertically-oscillating and horizontally-swinging cord-carrying arm hinged to the axis of the horizontally-oscillating arm, the whole arranged and operating substantially as described.

16. The combination of the horizontally-oscillating knotter-carrying arm $O'$, its knotter shield-plate $O$, the vertically-oscillating cord-holder $V$, and the pivoted cord-finger $l$ with the vertically-oscillating and horizontally-swinging cord-carrying arm, substantially as and for the purpose described.

ANDREW C. MILLER.

Witnesses:
F. MINHARD,
JAS. MELLOR.